March 2, 1954

D. GLESBY 2,670,866

MEANS FOR TRANSPORTING BULK COMMODITIES

Filed March 13, 1950

INVENTOR.
David Glesby
BY
Albert J. Fike
ATTORNEY.

March 2, 1954

D. GLESBY 2,670,866

MEANS FOR TRANSPORTING BULK COMMODITIES

Filed March 13, 1950

INVENTOR.
David Glesby
BY
ATTORNEY.

March 2, 1954

D. GLESBY 2,670,866

MEANS FOR TRANSPORTING BULK COMMODITIES

Filed March 13, 1950

INVENTOR.
BY David Glesby.

Albert J. Fihe

ATTORNEY.

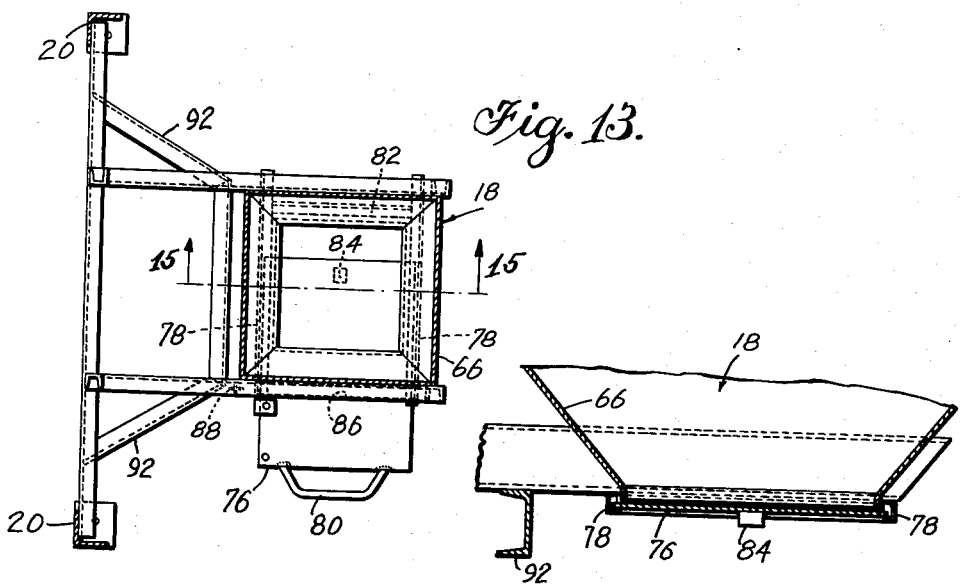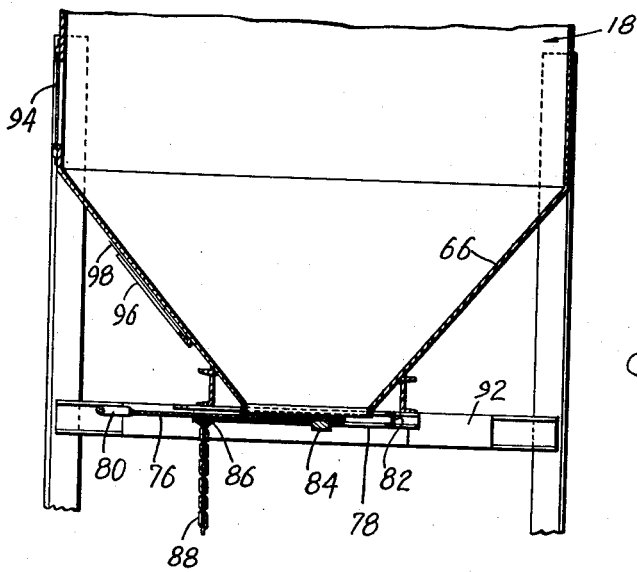

Patented Mar. 2, 1954

2,670,866

UNITED STATES PATENT OFFICE 2,670,866

MEANS FOR TRANSPORTING BULK COMMODITIES

David Glesby, Van Nuys, Calif.

Application March 13, 1950, Serial No. 149,295

1 Claim. (Cl. 214—512)

This invention relates to an improved means for transporting bulk commodities and has for one of its principal objects the provision of a combination truck or similar vehicle and a plurality of containers for a certain commodity, which containers are adapted to be moved by the truck to desired or designated places and left there until further transportation is to be accomplished.

One of the principal objects of this invention is to provide means for efficiently handling and transporting grain, feed and the like in comparatively large quantities and in suitable containers, and wherein the filled containers can be left at the point of delivery until empty whereupon they are again loaded upon the same or similar truck and transported to a central station for refilling and further delivery.

Another important object of the invention is to provide, in connection with a plurality of bins for containing feed, grain or some other bulk commodity, a specially constructed truck upon which the bins can be readily loaded and by which they can be easily carried from place to place, either full or empty, and can furthermore be delivered at desired points with a minimum expenditure of time and labor.

A further object of the invention resides in the provision of means for transporting feed, grain or similar commodities in previously prepared and filled bins or containers which can then be delivered to consumers of the feed and left at the consumer's place of business until empty, whereupon the bins can be replaced with similar bins filled at the mill and the empty bins taken away by the same truck which delivers the filled ones.

Yet another object of the invention is to provide a specially constructed bin for holding feed, grain or similar bulk commodities and which, at the same time, will be adapted for loading onto a particular design of truck or other vehicle and whereby the bin will be suitably supported on the truck for transportation purposes and will also be suitably positioned on the ground for intermittent delivery of the contents.

Another and still further important object of the invention is to provide in a combination truck and bin delivery system for bulk commodities, means for loading two or more of the bins upon one truck, either simultaneously or singly, and without disturbing the position or upsetting the equilibrium of bins already on the truck.

Yet another object is to provide in a means for the transportation of commodities in bulk, a truck or similar vehicle which, while particularly adapted for loading, transporting and delivering the bins for the bulk commodity, can also be used for ordinary transportation and holding purposes regardless of the commodity.

Other and further important objects of the invention will be apparent from the disclosures in the accompanying drawings and following specification.

The invention, in a preferred form, is illustrated in the drawings and hereinafter more fully described.

In the drawings:

Figure 13 is a view, partly in section, taken on the line 13—13 of Figure 15 looking downwardly.

Figure 14 is a sectional view taken on the line 14—14 of Figure 10 looking in the direction indicated by the arrows.

Figure 15 is a detail section taken on the line 15—15 of Figure 13 looking in the direction indicated.

As shown in the drawings:

Figure 1:
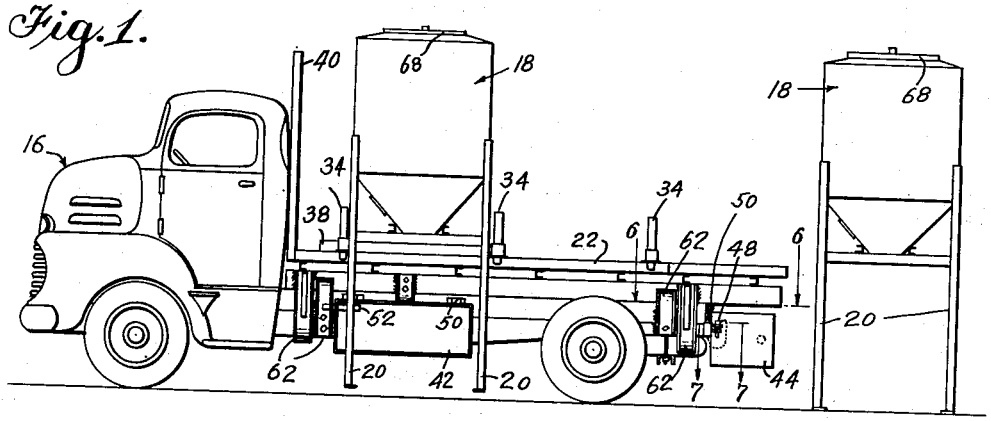
Figure 1 is a side elevation showing the improved truck and bin combination of this invention and illustrating the truck with one bin loaded thereon and another bin either delivered or about to be loaded.

The reference numeral 16 indicates generally the truck or similar vehicle used for the transportation of bulk commodities in accordance with the principle of this invention.

Figure 2:
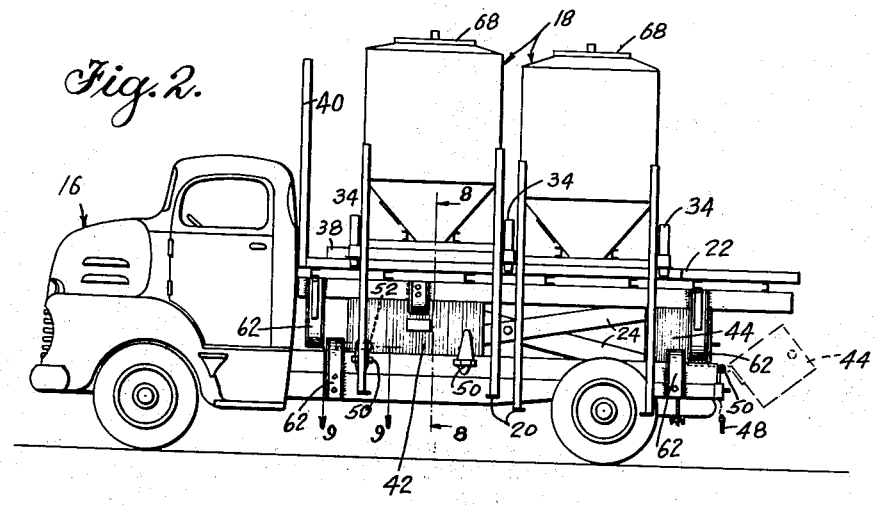
Figure 2 is a view somewhat similar to Figure 1 but showing both bins loaded onto the truck and ready for transportation from one place to another.
Figure 3:
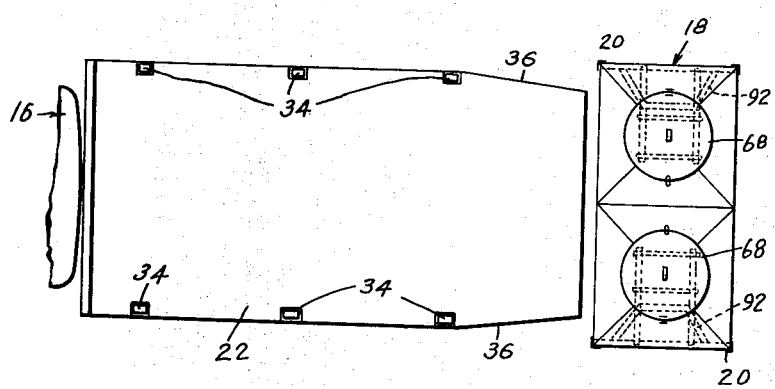
Figure 3 is a plan view showing the body of the truck and illustrating the same in conjunction with a bin which has either been just unloaded from the truck or is about to be loaded thereon.

The bulk commodity which is usually feed or grain, but which can be any other similar material, is contained and transported in bins 18, two of which are shown in each of Figures 1 and 2, and each bin is provided with four supporting legs 20 which are for the primary purpose of positioning the body of the bin at quite a distance above the ground so that it can be readily emptied by a person standing thereunder. However, these legs 20 are also for the purpose of supporting the main body 18 of the bin at a desired elevation above the ground so that the bed 22 of the truck 16 can be moved under the bin for loading purposes after which the bed 22 of the truck is raised hydraulically or in some other manner so that the legs 20 of the bins will clear the ground whereby the truck may be driven from one place to another as best shown in Figure 2.

Figure 4:
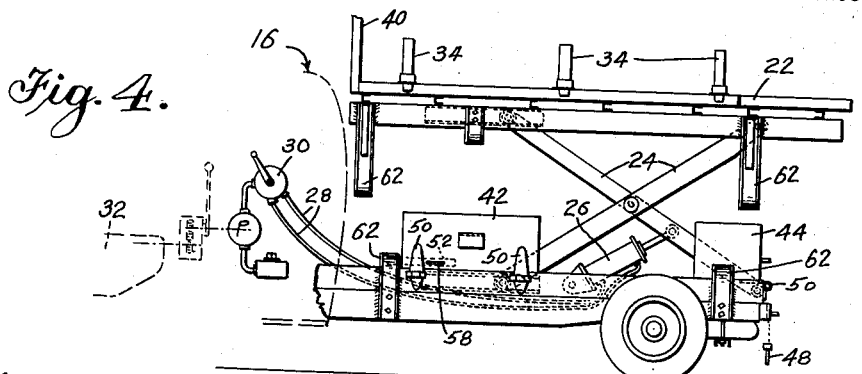
Figure 4 is a side elevation of the transporting truck used in connection with the commodity containing bins of this invention and illustrating particularly the means for raising and lowering the truck bed whereby the bins can be conveniently loaded, transported and unloaded.
Figure 5:
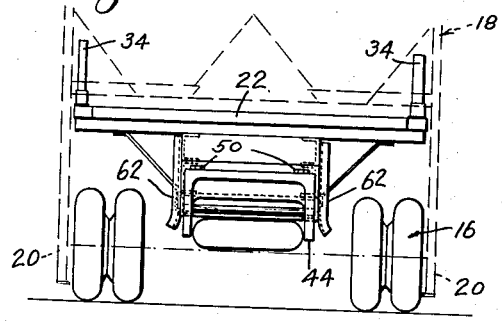
Figure 5 is a rear view of the truck with the truck body in bin carrying position.

This raising of the bed 22 of the truck 16 is preferably accomplished hydraulically in the manner illustrated in Figure 4 wherein a combination of links 24 is employed for the raising operation and power is supplied to a hydraulic pump 26 through fluid lines 28 controlled by valve 30. The control for this arrangement is in the cab of the truck and actual power is derived from the vehicle motor 32. The truck bed 22 can be raised to approximately the extreme height shown in Figure 4, but this extreme is not ordinarily employed.

For loading purposes, the truck bed 22 is first cleared of its side stakes 34, with perhaps the exception of the two at the front, and with the truck bed in lowermost position, the vehicle is then backed under the bin 18, as shown in Figure 1, with the rear end of the truck bed passing between the two sets of legs 20. The rear end of the truck bed is somewhat tapered as illustrated at 36 so that compensation will be made for slight inaccuracies in the backing operation.

When one tank or bin 18 is loaded onto the truck as shown in Figure 1 and others are to follow, the bin is loaded onto the forward end of the truck body and preferably against the forward stakes 34. Additional stakes 34 are then inserted into their respective sockets behind the bin, and before loading another bin onto the rear portion of the truck body, a pair of chocks or other supports 38 are placed under the foremost bin, as best shown in Figure 1, after which the truck body is raised slightly by means of the hydraulic elevator whereupon the lower ends of the legs 20 will clear the ground after which the truck can be backed into position beneath the next bin 18. When the second bin is loaded, the truck body 22 is then further elevated to the position shown in Figure 2, whereupon the truck with its load can be readily moved.

A wall or partition 40 is built onto the truck body just behind the cab, this being for the protection of the operator in case one of the bins 18 is accidentally tipped over and this wall also acts to prevent a complete overturning of the bin in the case of a sudden stop or the like.

In order to assure that the truck body will remain in the bin transporting height as shown in Figure 2, and also to remove the load from the elevating apparatus 24, additional supports are mounted on the chassis of the truck in a hinged relationship therewith. These can be tilted upwardly to support the truck body or platform with its load.

There are three of these hinged supports, one on each side of the truck as indicated at 42, and one at the rear as shown at 44. In Figure 1, these supports are all shown as in their lowermost non-loading supporting position and in Figure 2 they are shown in raised load supporting position and the intermediate stage of the rear load supporting element is shown in dotted lines in Figure 2. These hinged load supporting elements 42 and 44 are also shown in raised position in Figure 4.

Figures 6, 7:
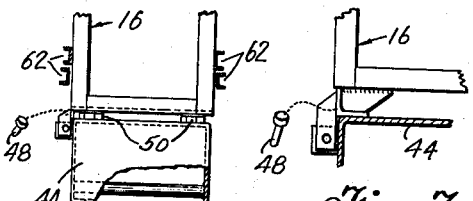
Figure 6 is a detail view of the shiftable element which supports the rear end of the truck bed at the desired elevation for holding the bins. This figure is taken on the line 6—6 of Figure 1.
Figure 7 is an enlarged sectional detail view taken on the line 7—7 of Figure 1 showing a portion of the structure of Figure 6 and more particularly the locking means for the shiftable support.

The rear supporting element 44 is shown in more detail in Figures 6 and 7, the lowermost position being shown in Figure 6, and the pin 48 for locking the same in both positions is also shown in these figures.

Figure 8:
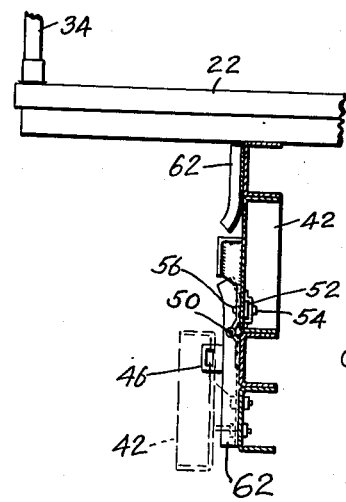
Figure 8 is a detail sectional view of one of the shiftable members for supporting the side of the truck body when the same is in bin carrying position as shown by the line 8—8 of Figure 2.
Figure 9:
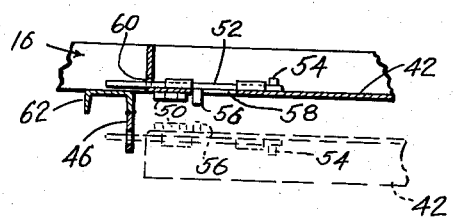
Figure 9 is a further sectional detail view, taken on the line 9—9 of Figure 2, illustrating the shiftable side support of Figure 8 and showing more particularly the latch means for locking the same in both raised and lowered position.

One of the side load supporting elements 42 is best shown in Figures 8 and 9, the load supporting position being in full lines in Figure 8, and the dropped non-load supporting position being indicated in dotted lines in this figure.

Hinges 50 allow of swinging of the element or chock 42 from one position to another and a single slidable latch 52 is provided for locking the same in both positions. This latch is manipulated by a handle 54 when the support 42 is in its lowermost position whereupon the end of the latch slides into a hole in a keeper 46. When the support 42 is in its raised position, the latch 52 is operated by means of a handle 56 moving in a slot 58 in the chassis and the end of the latch then slides through a hole 60 in a support which forms part of the truck chassis. Guides 62 are provided so that the various elements interfit properly when the body is being raised and lowered.

In Figures 10 to 15, inclusive, the bins 18 are shown in more detail, each of these comprising a main body portion preferably consisting of two compartments divided by a partition 64 whereby two different commodities may be handled in one bin. Each compartment is provided with sloping bottom portions 66 so that ready emptying will be possible.

A hatch or cover 68 is fitted onto the top of each compartment, preferably some hinged relationship as indicated at 70, and a chain 72 holding the padlock or other securing means is stapled onto the top of the bin as illustrated. A frangible seal 74 is provided for each of the covers 68 when the bin has been filled and the customer is requested to inspect this seal upon delivery, and if the same has been broken, this indicates that there may have possibly been some tampering with the contents, whereupon the customer may refuse delivery. A slidable gate 76 is provided at the bottom of each compartment of the bin, these being movable in channels 78 and provided with operating handles 80. Another channel or similar element 82 is provided at the rear, this forming part of a stop for preventing undesired excess rearward movement of the sliding gate 76.

A corresponding projection 84 is fitted onto the under face of each sliding gate 76 and this operates against the channel 82 at the rearward position of its movement and against a cross piece and support 86 at the forward position of its movement. A chain 88 is provided for supporting a padlock 90 or the like, whereby each delivery gate 76 may be securely locked to prevent unauthorized removal of the contents when the bin is at the customer's establishment.

Figure 10:
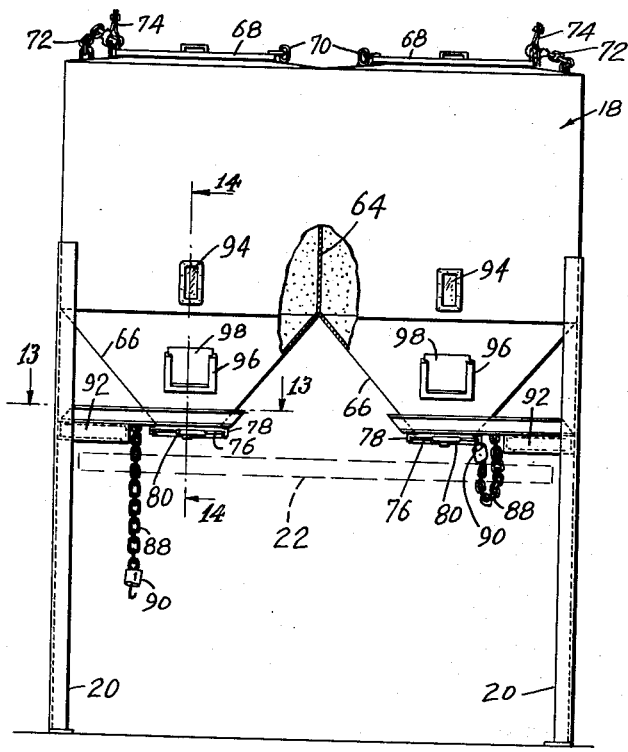
Figure 10 is a front elevation of one of the improved bins used in connection with the transportation of bulk grain, feed or other commodity as practiced by the apparatus of this invention.
Figure 11:
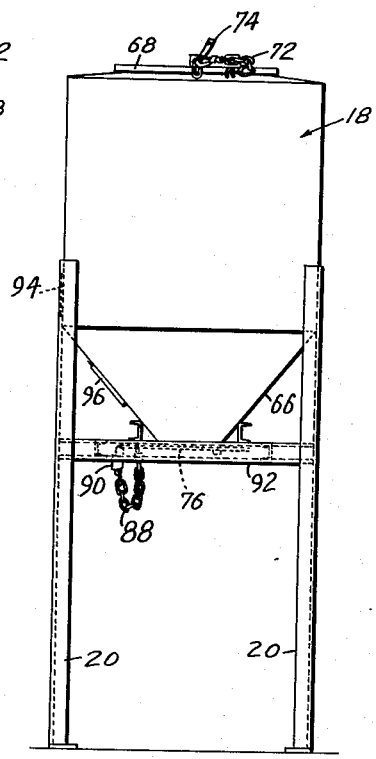
Figure 11 is a side elevation of the bin of Figure 10, and like Figure 10, shows the cover for filling the bin and a slide plate at the bottom which is used for emptying the same.
Figure 12:
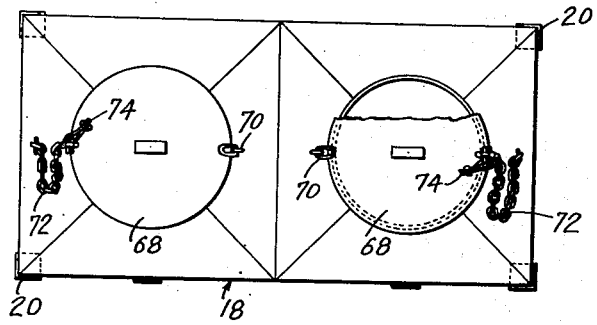
Figure 12 is a top plan view of the bin of Figures 10 and 11 showing the hatches or covers and also the means for locking the same whereby unauthorized removal of the contents is prevented.

Cantilever frames are provided beneath each bin 18 as best shown in Figure 13, these being preferably formed of angles 92, and the truck bed 22 is adapted to slide underneath these cantilever frames or supports, as best shown in Figure 10, whereby each bin 18 is adequately supported when on the truck and is also adequately mounted on its supports or legs 20. Each bin is provided with an opening covered by a transparent pane 94 whereby the amount of its contents can be observed, and a support 96 is provided on each bin for the reception of a card 98 which indicates the nature of the contents.

It will be apparent that herein is provided a novel and effective means for transporting various bulk commodities such as feed, grain and the like from the mill or place of manufacture to the consumer, and the nature of the invention is such that one truck can adequately handle quite a number of commodity containing bins, both for delivery and pick up purposes and with a minimum expenditure of time and labor. The bins can be filled at the mill or other point of production of the particular commodity and when delivery is desired a truck can be backed under one or more bins, the body then raised to the desired height properly supported in position by means of the elements 42 and 44, and delivery of the bins can then be made. The delivery can be by way of one or more bins as desired and empty bins can be readily picked up as full ones are delivered.

There is never any necessity for double handling of the commodity which has previously been necessary in that the customer usually had some sort of a container into which the commodity had to be emptied upon delivery. Here the bins are supplied by the manufacturer, are always available and the contents can be removed at will by the consumer. When the bin is empty or nearly empty, it can be very readily replaced by a full one.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

Means for transporting bulk commodities, including a truck having a flat platform, means for raising and lowering said platform, a plurality of bins removably supported on the platform, each bin designed for containing the commodity to be transported, each of said bins having supporting legs of a length slightly longer than the minimum height of the truck platform, the supporting legs for each bin spaced apart a distance slightly greater than the maximum width of the truck platform, each bin including means for supporting its main portion on the truck platform, the truck platform including means for locking the bins in desired position thereon, and further means for supporting one of the bins on the truck platform at a higher level than other bins, the truck including means for supporting its platform at a level intermediate its extreme of movement, said supporting means comprising hinged chocks and the truck chassis including further means for locking said hinged chocks in both operative and inoperative position, the truck platform being rearwardly tapered for better interfitting relationship with the legs of the bins, each bin including two compartments, filling doors and emptying gates for each compartment, means for locking said filling doors and gates, the truck platform and chassis having coacting guides, said coacting guides adjacent the hinged chocks.

DAVID GLESBY.

References Cited in the file of this patent

UNITED STATES PATENTS

| Number | Name | Date |
|---|---|---|
| 1,425,965 | Hocke | Aug. 15, 1922 |
| 1,526,527 | Butter | Feb. 17, 1925 |
| 2,027,421 | Eisenberg, Jr. | Jan. 14, 1936 |
| 2,110,424 | Quayle | Mar. 8, 1938 |
| 2,172,244 | Grundler | Sept. 5, 1939 |
| 2,304,622 | Barrett | Dec. 8, 1942 |
| 2,596,838 | Carver et al. | May 13, 1952 |